United States Patent
Altmann et al.

(10) Patent No.: US 6,545,492 B1
(45) Date of Patent: Apr. 8, 2003

(54) MULTIPLE LOCAL PROBE MEASURING DEVICE AND METHOD

(75) Inventors: Stephan Maximilian Altmann, Grafenwöhr; Johann Karl Heinrich Hörber, Weiltingen, both of (DE)

(73) Assignee: Europaisches Laboratorium fur Molekularbiologie (EMBL), Heidelberg (DE)

( * ) Notice: Subject to any disclaimer, the term of this patent is extended or adjusted under 35 U.S.C. 154(b) by 0 days.

(21) Appl. No.: 09/399,961

(22) Filed: Sep. 20, 1999

(51) Int. Cl.$^7$ ............................................. G01R 31/02

(52) U.S. Cl. ........................ 324/754; 324/762; 324/750

(58) Field of Search .................. 324/754, 750, 324/758, 767, 662, 761, 762; 250/306, 307

(56) References Cited

U.S. PATENT DOCUMENTS

| | | | |
|---|---|---|---|
| RE33,387 E | * 10/1990 | Binnig | ........................ 250/306 |
| 5,220,555 A | 6/1993 | Kawade et al. | |
| 5,262,643 A | 11/1993 | Hammond et al. | |
| 5,304,924 A | * 4/1994 | Yamano et al. | .............. 324/758 |
| 5,508,527 A | 4/1996 | Ryo et al. | |
| 5,600,137 A | 2/1997 | Saito et al. | |
| 5,929,643 A | * 7/1999 | Sakai et al. | .................. 324/750 |
| 6,028,305 A | 2/2000 | Minne et al. | |

FOREIGN PATENT DOCUMENTS

| | | |
|---|---|---|
| WO | WO 00 19166 A | 4/2000 |

OTHER PUBLICATIONS

Lutwyche, M. et al. "Microfabrication and Parallel Operation of 5X5 2D AFM Cantilever Arrays for Data Storage and Imaging," MEMS 98. Proceedings IEEE of the 11th Annual International Workshop on Micro Electro Mechanical Systems, An Investigation of Micro Structures, Sensors, Actuators, Machines and Systems. Heidelberg, Jan. 25–29, 1998, IEEE Workshop on Micro Electro ME, Jan. 25, 1998, pp. 8–11.

Hideki Kawakatsu et al., "Crystalline Lattice for Metrological Applications and Positioning Control by a Dual Tunneling–Unit Scanning Tunneling Microscope," Journal of Vaccuum Science and Technology: Part B, American Institute of Physics, New York, US, vol. 9, No. 2 Part 2, Mar. 1, 1991, pp. 651–654.

Chui B. W. et al., "Sidewall–Implanted Dual–Axis Piezoresistive Cantilever for AFM Data Storage Readback and Tracking," MEMS 98. Proceedings IEEE of the 11th Annual International Workshop on Micro Electro Mechanical Systems. An Investigation of Micro Structures, Sensors, Actuators, Machines and Systems. Heidelberg, Jan. 25–29, 1998, IEEE Workshop on Micro Electro ME, Jan. 25, 1998, pp. 12–17.

Diploma Thesis of Stephan M. Altmann, University of Heidelberg on or after Sep. 22, 1998.

(List continued on next page.)

*Primary Examiner*—Michael J. Sherry
*Assistant Examiner*—Minh N. Tang
(74) *Attorney, Agent, or Firm*—Arent Fox Kintner Plotkin & Kahn PLLC

(57) ABSTRACT

A local probe measuring device is provided for effecting local measurements of a sample. This device includes first and second local probes for local measurements with respect to a sample or a reference surface. A measurement condition adjustment arrangement is adapted to commonly adjust first and second measurement conditions of the respective first and second local probes with respect to the sample or the reference surface. A detection arrangement is provided that includes first and second detection arrangements associated with the respective first and second local probes and adapted to independently detect first and second measurement data referring to local measurements effected by the respective first and second local probes.

16 Claims, 8 Drawing Sheets

OTHER PUBLICATIONS

Albrecht T., "Microfabrication of cantilever styli for the atomic force microscope," J. Vac. Sc. Technol. A8(4), Jul./Aug. 1990, pp. 3385–3396.

Aime, J.P., Elkaakour, Z., Odi, C., Bouhacina, T., Michel, D., Curely, J., and Dautant, A. Comments on the Use of the Force Mode in Atomic Force Microscopy for Polymer Films. *Journal of Applied Physics,* 76:754–762, 1994.

Albrecht, T., Akamine, S., Carver, T., und Quate, C. Microfabrication of Cantilever Styli for the Atomic Force Microscope. *Journal of Vacuum Science Technology A,* 8:3386–3396, 1990.

Arai, T. and Masamichi, F. Effect of Tip Shape on Force–Distance Curves for AFM in Aqueous Electrolytes. *Journal of Electroanalytical Chemistry* 374, pp. 269–273, 1994.

Binnig, G. and Smith, D.P. Single–Tube Three–Dimensional Scanner for Scanning Tunneling Microscopy. *Review of Scientific Instruments,* 57:1688–1689, 1986.

Binnig, G., Rohrer, H., Gerber, C., and Weibel, E. Tunneling Through a Controlable Vacuum Gap. *Applied Physics Letters,* 40:178–180, 1982.

Burnham, N.A, Dominguez, D.D., Mowery, R.L., and Colton, R.J. Probing the Surface Forces of Monolayer Films with an Atomic Force Microscope. *Physical Review Letters,* 64:1931–1934, 1990.

Butt, H.J. Measuring Electrostatic, van der Waals, and Hydration Forces in Electrolyte Solutions with an Atomic Force Microscope. *Biophysical Journal* 60, pp. 1438–1444, 1991.

Butt, H.J., Müller, T. and Gross, H. Immobilizing Biomolecules for Scanning Force Microscopy by Embedding in Carbon. *Journal of Structural Biology,* 110:127–132, 1993.

Butt, H.J., Siedle, P., Seifert, K., Fendler, K., Seger, T., Bamberg, E., Weisenhorn, A.L., Goldie, K., and Engel, A. Scan Speed Limit in Atomic Force Microscopy. *Journal of Microscopy,* 169:75–84, 1993.

Butt, H.J. and Jaschke, M. Calculation of Thermal Noise in Atomic Force Microscopy. *Nanotechnology,* 6:1–7, 1995.

Firtel, M. and Beveridge, T.J. Scanning Probe Microscopy in Microbiology. *Micron,* 26:347–362, 1995.

Florin, E., Moy, V., and Gaub, H. Adhesion Forces Between Individual Ligand–Receptor Pairs. *Science* 264, pp. 415–417, 1994.

Grant, M.L., and Saville, D.A. Electrostatic Interactions Between a Nonuniformly Charged Sphere and a Charged Surface. *Journal of Colloidal Interface Science,* 171:35–45, 1995.

Guethner, P., Fischer, and U.C., Dransfeld, K. Scanning Near–Field Acoustic Microscopy. *Applied Physics B,* 48:89–92, 1989.

Hinterdorfer, P., Baumgartner, W., Gruber, H.J., Schilcher, K., and Schindler, H. Detection and Localization of Individual Antibody–Antigen Recognition Events by Atomic Force Microscopy. *Proceedings of the National Academy of Sciences, U.S.A.,* 93:3477–3481, 1996.

Hoh, J., et al., Quantized Adhesion Detection with the Atomic Force Microscope. *Journal of the American Chemical Society,* 114, 1992.

Hutter, J. and Bechhofer, J. Measurement and Manipulation of van der Waals Forces in Atomic Force Microscopy. *Journal of Vaccum Science Technology* B 12 (3), pp. 2251–2253, 1994.

Lee, G., Chrisey, L., and Colton, R. Direct Measurement of the Forces Between Complementary Strands of DNA. *Science* 266, pp. 771–773, 1994.

Lee, G., Kidwell D., And Colton, R. Sensing Discrete Streptavidin–Biotin Interactions with Atomic Force Microscopy. *Langmuir* 10, pp. 354–357, 1994.

Meyer, G. and Amer, N.M. Novel Optical Approch to Atomic Force Microscopy. *Applied Physics Letters,* 53:1045–1047, 1988.

Mueller, D., Amrein, M., and Engel, A. Adsorption of Biological Molecules to a Solid Support for Scanning Probe Microscopy. *Journal of Structural Bilogy,* 119:172–188, 1997.

Mueller, D., Schoenenberger, C.–A., Schabert, F., and Engel, A. Structural Changes in Native Membrane Proteins Monitored at Subnanometer Resolution with the Atomic Force Microscope: A Review. *Journal of Structural Biology,* 119:149–157, 1997.

Rief, M., Gautel, M., Oesterhelt, F., Fernandez, J., and Gaub, H. Reversible Unforlding of Indivdual Titin Immunoglobin Domains by AFM. *Science* 276, pp. 1109–1112, 1997.

Rief, M., Oesterhelt, F., Heymann, B., and Gaub, H. Single Molecule Force Spectroscopy on Polysaccharides by Atomic force Microscopy, *Science* 275, pp. 1295–1297, 1997.

Roth, C. and Lenhoff, A. Electrostatic and van der Waals Contributions to Protein Adsorbtion: Computation of Equilibrium Constants. *Langmuir* 9, pp. 962–972, 1993.

Roth, C.M. and Lenhoff, A.M. Electrostatic and van der Waals Contributions to Protein Adsorption: Comparison of Theory and Experiment. *Langmuir,* 11:3500–3509, 1995.

Salapka, M.V., Bergh, H.S., Lai, J., Majumdar, A., and McFarland, E. Multi–Mode Noise Analysis of Cantilevers for Scanning Probe Microscopy. *Journal of Applied Physics,* 81(6):2480–2487, 1997.

Van Cleef, M., Holt, S.A., Watson, G.S. and Myhra, S. Polysterene Spheres on Mica Substrates: AFM Calibration, Tip Parameters and Scan Artefacts. *Journal of Microscopy,* 181:2–9, 1996.

Wong, T. and Descouts, P. Atomic Force Microscopy under Liquid: A Comparative Study of Three Different AC Mode Operations. *Journal of Microscopy 178,* pp. 7–13, 1994.

Yip, C.M., Yip, C.C., and Ward, M.D. Direct Force Measurements of Insulin Monomer–Monomer Interactions. *Biochemistry,* 37:5439–5449, 1998.

G. Binning and C. F. Quate and Ch. Gerber, Atomic Force Microscope, Physical Review Letters, vol. 56, No. 9, pp. 930–933, Mar. 3, 1986.

Philippe Cluzel, Anne Lebrun, Christoph Heller, Richard Lavery, Jean–Louis Viovy, Didier Chatenay, Francois Caron, DNA: An Extensible Molecule, Science, vol. 271, pp. 792–794, Feb. 1996.

D. E. Leckband, J. N. Israelachvili, F. J. Schmitt, W. Knoll, Long–Range Attraction and Molecular Rearrangements in Receptor–Ligand Interactions, Science, vol. 255, pp. 1419–1421, Mar. 13, 1992.

Jürgen Fritz, Dario Anselmetti and Janina Jarchow and Xavier Fernandez–Busquets, Probing Single Biomolecules with Atomic Force Microscopy, *Journal of Structural Biology* 119, pp. 165–171 (1997) Article No. SB973887.

Roters A. and Johannsmann, D. distance Dependent Noise Measurements in Scanning Force Microscopy. *Journal of Physics: Condensed Matter,* 8:7561 ff., 1996.

Xu, W., Blackford, B.L., Cordes, J.G., Jericho, M.H., Pink, D.A., Levadny, V.G., and Beveridge, T. Atomic Force Microscope Measurements of Long–Range forces Near Lipid–Coated Surfaces in Electrolytes. *Biophysical Journal,* 72:1404–1413, 1997.

\* cited by examiner

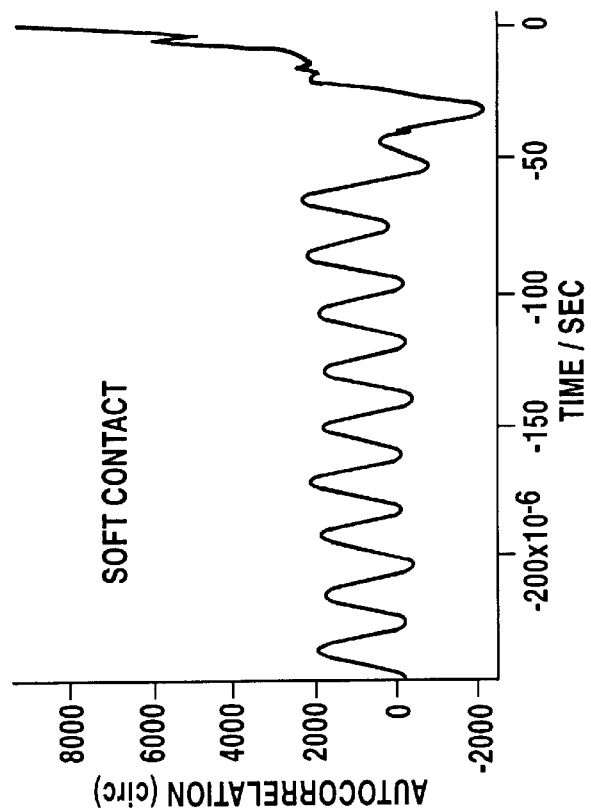
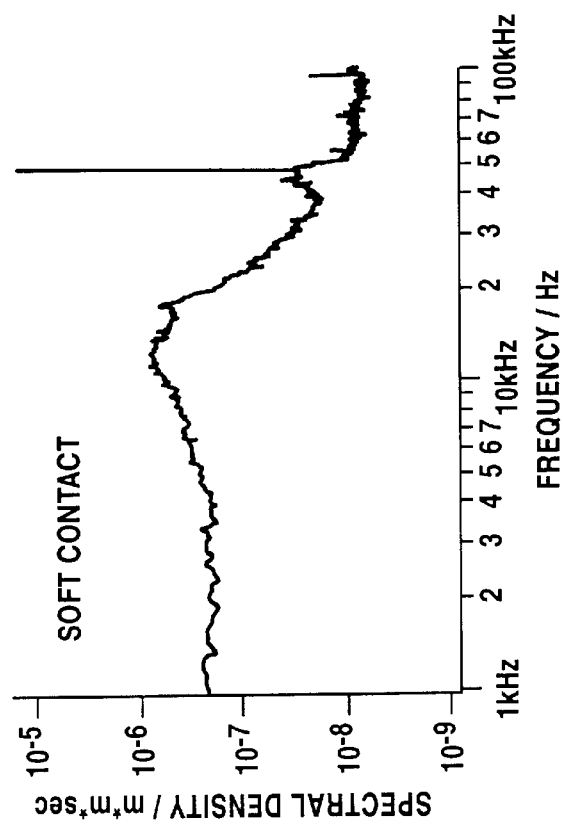

MULTIPLE LOCAL PROBE MEASURING DEVICE AND METHOD

The present invention concerns a multiple local probe measuring device for effecting local measurements referring to a sample multiple local probe measuring method and a multiple local probe manipulation method. One application field of the novel device and the novel methods is the scanning force microscopy (SFM), also known as atomic force microscopy (AFM). However, the invention is not restricted to such an application, The basic concept is applicable to the whole range of local probe techniques developed so far, especially all other scanning probe microscopy (SPM) techniques which require stabilization of measurement conditions, e.g. distance relations, for microscope probes, possibly cantilevers, for high-resolution measurements. Since it is hardly possible to give a complete list of scanning probe microscope techniques to which the invention can be applied, only some important techniques are given; scanning tunneling microscopy (STM), magnetic force microscopy (MFM), scanning near-field optical microscopy (SNOM), lateral force microscopy (LFM), electrical field/force microscopy (EFM), magneto-tunneling microscopy and spin sensitive tunneling microscopy.

An object of the invention is to allow measurements with well defined measurement conditions. To this end, the invention provides for at least one of a stabilization of measurement conditions and a calibration and detection of measurement conditions.

In many local probe microscopy techniques, a distance of a local probe with respect to a sample or a reference surface is an essential parameter defining the measurement conditions. Accordingly, at least one of a stabilization, calibration, and detection of a distance associated with a local probe with respect to a sample or a reference surface is a central field to which the invention can be applied. As will be explained in more detail, the invention proposes providing a plurality of local probes to allow at least one of a calibration, detection, and stabilization of measurement conditions for at least one local probe on the basis of measurement effected with respect to at least one other local probe. For many applications, it will be sufficient to provide two local probes, one of the local probes being used for at least one of calibration, detection, and stabilization of the measurement conditions of the other local probe.

In the following the background and concept of the present invention will be exemplified with reference to the scanning force microscopy technique on the basis of two local probes in the form of cantilevers, as commonly used for scanning force/atomic force microscopy. According to the invention, there is provided a detector arrangement allowing independent detection of first measurement data referring to local measurements effected by first local probe and independent detection of second measurement data referring to local measurements effected by a second local probe in the following, it will be assumed that this detection arrangement is realized by a double sensor system.

The concept of the invention can easily be extended to multiple local probe measurement devices having more than two local probes by providing a corresponding detection arrangement adapted to independently detect measurement data for each local probe with respect to the sample or the reference surface. Such a detection arrangement may be realized by a multiple independent sensor system. The provision of more local probes than a first probe and a second local probe allows a further increase of the stability and well defined measurement conditions possibly comprising a well defined orientation of a local probe in three-dimensional space.

BACKGROUND OF THE INVENTION

Scanning force microscopes (SFM) were in developed in 1986 by Binnig et al. (compare: Binnig, G. et al., PhysRev Letters, 1986, Vol. 56(9), p. 930–933) for imaging non-conducting surface with atomic resolution. They have since become a widely used tool in the semi-conductor industry, biological research and surface science. The first SFM was basically a thin metal foil acting as a cantilever, which was jammed between an STM-tip and the sample surface. Since the cantilever was a conducting metal, it become possible to measure the surface corrugation of non-conducting samples by monitoring how the foremost tip of the cantilever pointing towards the sample was deflected while moving across the sample surface on the basis of a tunneling current between the cantilever and a probing tip according to the scanning tunneling microscopy principle. Today, the registration of a laser's deflection from the back of the cantilever on a segmented photodiode is commonly used for this task (compare: Meyer, G. et al., Physics Letters, 1988, Vol. 53, p. 1045–1047).

Just as Binnig and Rohrer were originally interested in doing local spectroscopy on superconductors while developing the scanning tunneling microscope (STM) in 1981 (compare: Binnig, G. et al., ApplPhys Letters, 1982, Vol. 40, p. 178–180). The SFM was soon applied to local measurements of forces between different materials in vacuum, gaseous atmospheres, and in liquid. For many researches in different fields, the SFM has become an instrument for measuring local force-distance profiles on the atomic and molecular scale. Measurements that have been performed recently were concerned with ligand-receptor binding forces (compare: Florin et al., Science 1994, Vol. 264, p. 415–417), the unfolding and refolding of proteins (compare: Rief et al., Science, 1997, Vol. 276, p. 1109–1112), stretching of DNA as well as monitoring charge migration on semiconductors and conductor/insulator surfaces (compare: Yoo, M. J., et al., Science, 1997, Vol. 276, p. 579–582).

Local measurements of forces between tip and surface suffer from the following problems: 1) drift of the positioning arrangement, generally a piezo (immediately after the piezo has been extended or compressed); 2) hysteresis of the positioning arrangement or piezo; 3) mechanical drift; 4) thermal drift between sensor and sample on time scales ranging from seconds to hours; and 5) general mechanical instability resulting from the fact that the sensors' mechanical "feedback" on the sample is typically realized via a mechanical arm of much larger dimensions and mass than the sensor itself.

These problems can be alleviated to some degree if the force between tip and surface and, therefore, the distance between substrate and sample surface is kept constant, for instance, by keeping the deflection-angle of the cantilever constant (constant force mode). This is restricted to cases, though, where the lever (cantilever) is actually in contact with the sample surface and the normal force on the tip is large enough so as to be well distinguishable from any background noise.

A minimal force-level in the range of a hundred pN is generally required to provide a stable feedback control. Many interactions, especially of biological molecules under physiological conditions, are in the range well below 100 pN down to the level of thermally induced fluctuation forces of the cantilever. Presently available instruments are not capable of locally stabilized measurements at well-defined distances from the sample in this important force range of thermally fluctuating sensors (few pN).

Furthermore, data often need to be sampled locally over time periods of seconds to hours. Stability problems (as enumerated above) of instruments available to date ultimately render such measurements impossible.

OVERVIEW OF THE INVENTION

One object of the invention is to provide a fast, independent, active, and in itself stable control of measurement conditions for local probe measurements, possibly the distance between a sensor tip and a sample surface.

Another object of the invention is to provide a way to detect the distance between the sensor tip and the sample surface.

Another object of the invention is to provide a way to calibrate the distance between the sensor tip and the sample surface.

According to one aspect, the invention provides a control system to achieve at least one of said objects. The basic concept behind this control system is based on the fundamental idea of appropriate mechanical and geometric scaling of feedback components for spacial stabilization of sensors used in local probe techniques.

Development on local probes in general and scanning probe instruments in particular has lately been focussed largely on the miniaturization of probes for measurements of very small distances, forces and energies. Problems with the stability of such instruments result from overlooking the fact that mechanical stability of such systems is still controlled by feedback components of relatively large mass which are linked by more or less rigid connections over long distances and which are usually made of different materials as well. Especially scanning probe instruments are characterized by such connections which reach from the sensor holder via some more or less rigid coupling to the instrument body to the scanning stage and finally the sample holder.

The basic idea behind faster and more stable feedback controls proposed here rests on the concept of reducing the distance as well the mass of the mechanical coupling between the sample and sensor as much as possible. This can be done by short-distance-low-mass closing of the "mechanical feedback loop" through rigidly coupling two or more Independent miniature sensors for generating at least one independent force-distance-control feedback signal. By reducing mass and length of the mechanical coupling in the feedback loop to the dimensions of the sensory-system intended for measurements one increases substantially stability and with an independent distance measurement the experimental freedom.

One example for a multi-sensor system according to the invention exemplifying the concept of the invention is a system having one additional cantilever/sensor in a scanning probe microscope (SPM), according to a preferred embodiment in a scanning force microscope (SFM) for achieving higher stability and gaining access to a new applications. The most important advantage of such a double sensor SPM (DS-SPM) is its unique stability over unrestricted time scales, supplying a new and sound basis for measuring forces and potentials with Angstroem spatial and pN force resolution.

The multi-sensor system will be exemplified in the following on the basis of a double-sensor system for scanning force microscopy. The principles of the invention can easily be extended to multi-sensor system of any scanning probe microscopy technique having two or more local probes.

Commercial SFM exclusively use one and the same lever/sensor for two tasks: 1) to acquire sensory-data about the interactions between tip and sample surface, and 2) to control the force-distance between tip and surface. The double-sensor system for SFM is based on a concept allowing a stabilization and optimization of local SFM measurements, according to which the tasks 1) and 2) are split up onto two sensors sitting next to each other, e.g., on the same substrate. As sample and substrate approach each other, the first sensor to reach the surface will be called the distance sensor. The second sensor to reach the surface will then be called the interaction sensor. The sequence according to which the sensors approach the surface can be determined in advance.

Which of the two tips reaches the sample surface first and how much further the distance between sample and surface must be reduced for the second lever to come into contact with the surface depends on the size of and the distance between the levers employed, especially if commercially available cantilevers are used. A typical height difference between cantilevers of commercially available substrates is about 5 to 10 micrometers, and a typical lateral distance between the cantilevers is about 100 micrometers. The height difference may be changed by tilting the short face of the substrate against the sample surface, for example to obtain a height difference of 1 to 50, preferably 10 to 20 micrometers.

The distance sensor can always be kept in contact with the surface and will therefore continuously supply a clear force signal for the distance feedback with Angstrom resolution. The second interaction sensor can now be used for independently detecting force distance profiles on, close to and also at well defined distances from the sample surface. Splitting the tasks of distance and interaction detection between two separate sensors sitting side by side (possibly on the same substrate) thus provides a new level of stability to scanning probe microscopes and adds important additional freedom for the design of measurements.

The cantilever deflection needs to be detected independently for each of the two levers. This can be done by two independent optical beam deflection setups, for example. Other options would be to use any combination of optical, interference or electrical lever detection schemes. Especially cantilevers with integrated piezo-crystal detectors are very promising for this task.

Conventional SFM are based on just one sensor and become locally stable only when a feedback signal with a sufficient signal-to-noise ratio is available. This is only the case after the single sensor tip has contacted the surface and a certain deflection amplitude is reached. The latter must at least be greater than the combined thermal and detection-noise-amplitude of the free lever and, therefore, easily leads to normal forces on the scale of 100 or more pN which compromise the sensitivity, the design and the general freedom of the experiment considerably. A well-defined distance control before the tip of the single lever has reached or after it has left the surface is impossible in these conventional setups.

The double-sensor system solves these problems by means of the interaction sensor and the distance sensor. The distance between the interaction sensor and the sample surface can actively be controlled with Angstrom resolution as soon as the distance sensor has made contact with the surface. At this point, the interaction sensor is still typically 1 to 60 micrometers above the sample surface. The sensory signal coming from this lever can now be used to do measurements at any distance from the surface and in contact with the surface at normal forces determined only by the sensitivity of the detection system and the spring constant of the cantilever used.

The interaction sensor may approach and retract from the surface while the distance between substrate and sample is actively controlled by the distance sensor feedback. Any creep or drift of the piezo in height direction can be corrected on long as well as on short time scales, i.e. from milliseconds to hours, possibly even days. This means especially that it is possible to stop the approach or retract of the interaction sensor at any desired distance from the surface for any duration of time. The lever will stay at exactly this position, i.e. the distance between substrate and surface will be kept at exactly this value by the distance sensor feedback. Depending on the nature of the sample surface it is also possible to scan the interaction sensor in parallel to the surface at well defined distances.

The approach according to the invention differs substantially from approaches of the prior art aiming to determine the distance of the lever from the sample by additional detection means based on fiber-optical interference (compare: Martin, Y., et at., J. ApplPhys. 1987, Vol. 61, p. 4723 et seq) or simultaneous capacitance measurements (compare; Barret, R. C. and Quate, C. F., J. Appl.Phys., 1991, Vol. 70, p. 2725 et seq). Both known approaches immediately set specific requirements on the sample surface or the constancy of ionic strength of solutions used in fluid-cell experiments. Experimental requirements must therefore be compromised without the attainment of true distance and thus force control.

A crucial and highly important but in no way critical point of the double-sensor system (or multi-sensor system) according to the invention for atomic force microscopy and the like is a high mechanical stability with respect to the sensors, which can be reached by introducing a rigid mechanical coupling between the distance feedback sensor (s) and interaction sensor(s) on the scale of only a few hundred micrometers, generally on a scale in the order of dimensions of the local probes themselves. As has already been indicated, in conventional SFM a mechanical coupling between the sample and the sensor is realized via more or less rigid connections between the sample, piezo, piezoholder, instrument base and sample holder. The coupling is thus relayed over a distance of several centimeters instead of a few hundred micrometers.

Commercially available cantilever designs for SFM already typically offer several levers of different lengths and spring constants. Therefore, existing supplies of cantilever substrates can be used together with a proper design of a multiple detection system, preferably a multiple optical detection system. Such optical detection systems can be integrated rather easily in nearly all commercial instruments and thus may provide a new generation of scanning probe instruments with unprecedented stability and tip/sample approach control.

The principle of the invention can be extended to any local probe measuring device and any local probe measuring method allowing local measurements referring to a sample. Accordingly, the invention provides a local probe measuring device for effecting local measurements referring to a sample, comprising a first local probe for local measurements with respect to a sample or a reference surface, a second local probe for local measurements with respect to the sample or the reference surface, a measurement condition adjustment arrangement adapted to commonly adjust a first measurement condition of the first local probe with respect to the sample or the reference surface and a second measurement condition of the second local probe with respect to the sample or the reference surface, a detection arrangement comprising a first detection arrangement associated with the first local probe adapted to independently detect first measurement data referring to local measurements effected by said first local probe and a second detection arrangement associated with the second local probe adapted to independently detect second measurement data referring to local measurements effected by said second local probe.

The local probe measuring device according to the invention may comprise a controller adapted to control via said measurement condition adjustment arrangement said first and second measurement conditions on the basis of one of said first and second measurement data.

It is to advantage if the controller and the detection arrangement are adapted to adjust via said measurement condition adjustment arrangement at least one of said first and second measurement conditions on the basis of one of said first and second measurement data and then to obtain the respective other said first and second measurement data for the adjusted measurement condition.

It is proposed that said controller, said positioning arrangement and said detection arrangement are adapted to adjust said first measurement condition on the basis of said first measurement data and then to obtain said second measurement data for the resulting second measurement condition or to adjust said second measurement condition on the basis of said second measurement data and then to obtain said first measurement data for the resulting first measurement condition.

Said first and second measurement conditions may comprise distance relations of the local probes with respect to the sample or the reference surface. In this case, the measurement condition adjustment arrangement may comprise a positioning arrangement adapted to commonly adjust said distance relations. The positioning arrangement may comprise at least one piezo-crystal.

The local probe measuring device may comprise more than two local probes adapted to effect local measurements with respect to the sample or the reference surface. The measurement conditions of this plurality of local probes may be commonly adjusted by said measurement condition adjustment arrangement (possibly the positioning arrangement). In the case of more than two local probes, it is preferred that the detection arrangement be adapted to independently detect measurement data referring to local measurements effected by each local probe.

Preferably, there are provisions to control measurement conditions of at least one of said local probes (two local probes or more) via said measurement condition adjustment arrangement (possibly the positioning arrangement) on the basis of local measurements effected by at least one other local probe of said local probes. According to a preferred embodiment there are provisions to control measurement conditions of one of said local probes on the basis of local measurements effected by at least three other local probes of said local probes. Preferably, the at least three other local probes are arranged around said one local probe.

At least one of said local probes may be one of an atomic force microscopy probe, a lateral force microscopy probe, a tunneling microscopy probe, a magnetic force microscopy probe, an electric force microscopy probe, a near-field optical microscopy probe and an other local probe microscopy probe. It is possible that all the local probes used during one measurement are of the same probe type. For certain measurements, however, it may be useful if at least two of the local probes used during one measurement are of different probe types.

According to one aspect of the invention, a local probe measuring device for effecting local measurements referring to a sample is provided which comprises: a first local probe for local measurements with respect to a sample or a reference surface, a second local probe for local measurements with respect to the sample or the reference surface, a rigid mechanical coupling between the first local probe and the second local probe, a positioning arrangement adapted to commonly adjust distance relations of the probes with respect to the sample or the reference surface to commonly adjust a first measurement condition of the first local probe with respect to the sample or the reference surface and a second measurement condition of the second local probe with respect to the sample or the reference surface, a detection arrangement comprising a first detection arrangement associated with the first local probe adapted to independently detect first measurement data refering to local measurements effected by said first local probe and a second detection arrangement associated with the second local probe adapted to independently detect second measurement data refering to local measurements effected by said second local probe.

According to a further aspect, the invention provides a local probe measuring device for measuring local interactions between a local probe arrangement and a sample, comprising: a first local probe adapted to interact locally with a sample or a reference surface, a second local probe adapted to interact locally with the sample or a reference surface, a rigid mechanical coupling between the first local probe and the second local probe, a positioning arrangement adapted to commonly adjust at least one of a first distance of the first local probe with respect to the sample or the reference surface and a first local interaction of the first probe with the sample or the reference surface and at least one of a second distance of the second local probe with respect to the sample or the reference surface and a second local interaction of the second local probe with the sample or the reference surface, a detection arrangement comprising a first detection arrangement associated with the first local probe adapted to detect at least one of the first distance and the first local interaction independently of the second distance and the second local interaction and a second detection arrangement associated with the second local probe adapted to detect at least one of the second distance and the second local interaction independently of the first distance and the first interaction.

Further, according to still another aspect the invention provides a local probe measuring device for measuring local interactions between a cantilever probe arrangement and a sample, comprising: a first cantilever probe adapted to interact locally with a sample or a reference surface, a second cantilever probe adapted to interact locally with the sample or a reference surface, a rigid mechanical coupling between a base section of the first cantilever probe and a base section of the second cantilever probe, a positioning arrangement adapted to commonly adjust a first distance of the base section of the first cantilever probe with respect to the sample or the reference surface and a second distance of the base section of the second local probe with respect to the sample or the reference surface, a detection arrangement comprising a first detection arrangement associated with the first cantilever probe adapted to independently detect at least one of a first deflection of the first cantilever probe and a first local interaction of the first cantilever probe with said sample or reference surface and a second detection arrangement associated with the second cantilever probe adapted to independently detect at least one of a second deflection of the second cantilever probe and a second local interaction of the second cantilever probe with said sample or reference surface.

According to another aspect of the invention, a method of effecting local measurements referring to a sample is provided, which comprises: providing at least two local probes in a positional relation with respect to a sample or a reference surface, said local probes preferably being rigidly mechanically coupled with each other, adjusting a respective measurement condition for at least one of said local probes on the basis of measurements effected with respect to at least one other of said local probes, and effecting a measurement with respect said at least one local probe with reference to said measurements effected with respect to said at least one other local probe.

According to still another aspect of the invention, a method of effecting local manipulations referring to a sample is provided, which comprises: providing at least two local probes in a positional relation with respect to a sample or a reference surface, said local probes preferably being rigidly mechanically coupled with each other, adjusting a respective manipulation condition for at least one of said local probes on the basis of measurements effected with respect to at least one other of said local probes, and manipulating said sample by means of said at least one local probe with reference to said measurements effected with respect to said at least one other local probe.

Features of preferred embodiments of the local probe measuring devices and the local probe measuring and manipulation method are set forth in the claims which are part of the disclosure of this specification.

A local probe measuring device according to the invention, a local probe measuring method according to the invention and a local probe manipulation method according to the invention each open up options for many new applications which can hardly be foreseen at present. In the context of atomic force microscopy or scanning force microscopy and the like, some new applications are the following:

1) Samples, e.g. in biological applications, can locally be measured at effectively vanishing normal-forces between tip and sample. This is especially interesting for measuring specific protein interactions, e.g. ligand/receptor interactions, in a controlled way. This is an important feature for the application of SFM in drug screening applications.

2) The invention also allows for force-spectroscopy on proteins and polymers where contact between tip and sample can be reached at almost zero-force and thus minimal mechanical interaction between sample and sensor. The active control of the interaction sensor and sample surface distance opens up the possibility of measuring e.g. unfolding potentials of proteins with very soft levers or the unbinding of molecular adhesion bonds under constant force in liquid environments (compare: Evans, E. and Ritchie, K., BioPhys J., 1997, Vol 72, p. 1541–1555).

3) By employing levers for the interaction sensor with different and especially with very soft or hard spring constants it is now possible to measure interactions close as well as further away from the sample surface at Angstroem- und pN-resolution. For these measurements it is necessary to keep the interaction sensor at well defined distances from the sample surface for times which increase as the spring constant of the lever decreases. These times can reach up to seconds for the recording of time-series of the thermal position fluctuations of the sensor-tip in local potentials, which can be analyzed by correlation and spectral transforms. Using only the thermally excited amplitudes of the cantilever, one decreases the influence of the sensor on the sample and the danger of dissipating energy into the sample to a minimum and thereby reduces the danger of locally altering or even destroying the sample.

4) One option for implementing lateral scanning at well defined distances from the surfaces may be based on e.g. Si/SiN$_3$ sample carriers, which would allow for atomically flat reference surfaces over which the distance sensor may be scanned laterally at constant normal force without changing the distance between interaction sensor and any locally decorated sample surface.

5) A multi-sensor system according to the invention allows a stabilisation at minimal interaction forces for attractive mode measurements in scanning force microscopy (atomic force microscopy).

6) A multi-sensor setup according to the invention can easily be adapted to flow chamber experiments, since thermal or mechanical disturbances can be compensated by the multi-sensor system. Since additional optical interference sensors are not necessary, the exchange of fluids in liquid cells becomes easier.

7) Instruments equipped with a multi-sensor system according to the invention are well suited for product control or general measurements under mechanically unstable conditions. The only limitation results from the speed of the feedback which compensates for these disturbances through the distance sensor force-distance feedback.

In the following, some embodiments of local probe measuring devices will be explained solely as examples and with reference to the figures. Further, some examples of applications of local probe measuring devices according to the invention will be given.

Figure 1:
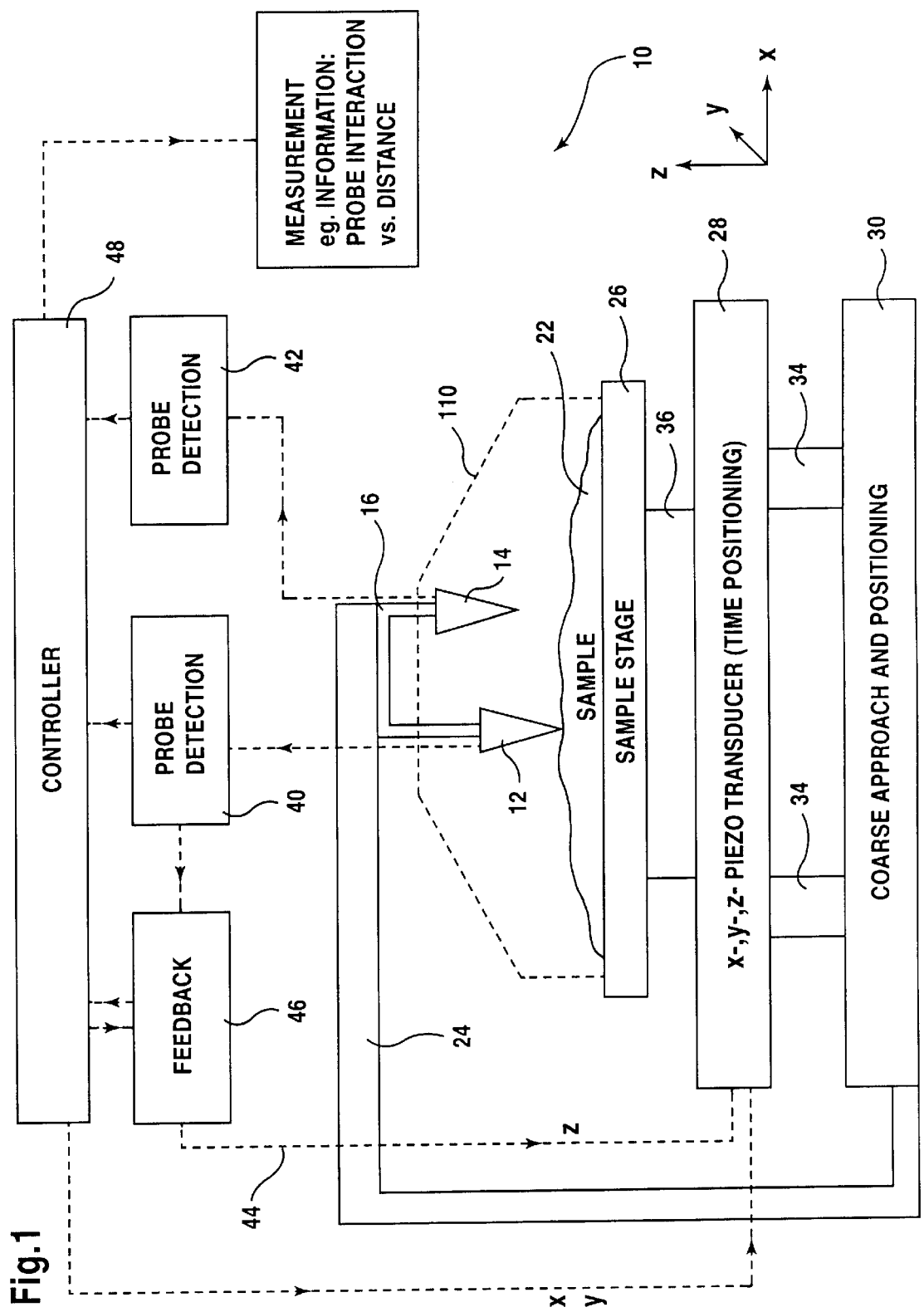
FIG. 1 is a schematic diagram of a local probe measuring device according to a first embodiment of the invention having two local probes.

FIG. 1 shows a multiple local probe measuring device according to one embodiment of the present invention. The local probe measuring device 10 has a first local probe 12 and a second local probe 14, which are rigidly connected with each other by means of a connection part 16, possibly a substrate which is integral with the local probes 12 and 14. The local probes may be of the cantilever type. In this case, the respective local probe may comprise a beam cantilever (cf. cantilever 18 in FIG. 2) or a triangular cantilever (cf. cantilever 20 in FIG. 2) having, at a free end, a tip serving to probe a sample 22. In case of cantilever probes, the local probe measuring device may also be denoted as cantilever probe measuring device.

FIG. 1 shows schematically the general structure of a multiple local probe measuring device according to an example independently of any particular local probe measuring technique. For example, the local probe measuring device may be used for effecting atomic force microscopy (AFM) or scanning force microscopy (SFM) measurements. Other examples are lateral force microscopy (LFM) measurements, scanning tunneling microscopy (STM) measurements, and scanning near-field optical microscopy (SNOM) measurements, to name but a few local probe techniques. However, the local probe measuring device 10 shown in FIG. 1 may as well be adapted to effect any other local probe microscopy measurements, such as electric field/force microscopy (EFM) measurements, magnetic field/force microscopy (MFM) measurements, scanning near-field acoustic microscopy (SNAM) measurements, magneto-tunneling microscopy measurements, and the like, which require a local probe held mechanically in the vicinity of a sample.

Referring again to FIG. 1, the device 10 comprises a bracket 24 holding the connecting part 16 together with the local probes 12 and 14 over the sample 22, which is arranged on a sample stage 26. The sample stage 26 and, accordingly, the sample may be finely positioned with respect to the two local probes 12 and 14 by means of a piezo transducer 28, which is adapted to move the sample stage 26 with the sample 22 in X-, Y-, and Z-directions.

A coarse approach and positioning of the sample 22 with respect to the local probes 12 and 14 may be effected by means of a coarse positioning arrangement 30, possibly comprising a support plate mounted on a tripot adjustable by means of slow-motion tangent screws or/and an electrical motor (e.g., a DC motor) coupled by means of a gear (possibly a slow-motion tangent screw or the like) with the tripot.

If one considers one of the two local probes 12 and 14, the respective local probe, on the one hand, and the sample 22, on the other, are located at opposite ends of a mechanical linkage loop comprising the connection part 16, the bracket 24, the coarse positioning arrangement 30, the piezo transducer 28, the sample stage 26, and any further mechanical connection components between the mentioned parts, such as intermediate members 34, 36 between the course positioning arrangement 30, the piezo transducer 28, and the sample stage 26. If a distance between one of the local probes and the sample is adjusted by means of the piezo transducer 28 and the coarse positioning arrangement 30, any mechanical instability of the mentioned mechanical loop and any piezo drift of the piezo transducer will cause variations of the adjusted distance between the respective local probe and the sample.

According to a prior-art approach, one could use detection results obtained for the respective probe by means of a detector (detector 40 for probe 12, and detector 42 for probe 14) to stabilize the distance for the respective (the same) probe. For example, one could adjust the distance between probe 12 and sample 22 by means of the coarse positioning arrangement 30 and the piezo transducer 28 and use the detection result obtained by the detector 40 for this probe to control the distance of this probe (probe 12) with respect to the sample 22 by means of a feedback control loop 44 comprising the piezo transducer 28, the probe 12, the probe detector 40, and a feedback transformer 46. The feedback transformer 46 may comprise a high-voltage amplifier arrangement adapted to translate a control variable into a corresponding driving voltage sent to the piezo transducer 28.

This approach works quite well if the detection signal received for the respective local probe (in the example, probe 12) is strong enough with respect to noice. Even if the signal is strong enough to obtain the desired feedback control of the distance between the local probe and the sample, this approach has the advantage that there may be several interactions between the sample and the local probe, which might contribute to the detection signal. In the case of an atomic force microscopy probe (possibly of the cantilever type), for example, the forces between the probe tip and the surface of the sample may result from a multitude of interactions so that the central contrast mechanism on which the high resolution of atomic force microscopy is based will often become distorted.

The explained prior-art approach of controlling the distance of a measuring probe will completely fail if the detection signal received for the local probe is too small with respect to noise so that there is no signal on which the feedback control can be based.

In realization of an approach according to the present invention, the multiple local probe measuring device 10 has a plurality of local probes, namely the two local probes 12 and 14, with the detection results obtained for one of the local probes being used for the feedback control of the distances of both local probes with respect to the sample and the desired measurement information is obtained via the other local probe. The desired measurement information may comprise, for example, information with respect to the probe interaction versus distance between the respective probe and the sample surface, In the diagram of FIG. 1, probe 12 is used for the feedback control of the distances of both probes 12 and 14 with respect to the sample surface and the detection results of probe 14 are evaluated to obtain the desired measurement information. As shown in FIG. 1, the probes 12 and 14 may have different distances with respect to the sample. In the situation shown in FIG. 1, the probe 14 has a larger distance with respect to the sample than probe 12. Accordingly, any interaction between the probes and the sample, which decreases with the distances, will give a stronger detection signal for probe 12 than for probe 14. For example, an interaction between sample 22 and probe 14 or another influence on probe 14 which gives a rise to a detection signal which is not strong enough for a feedback control of the distance, may give rise to a much higher detection signal for the other probe (probe 12) and may, accordingly, enable a feedback control of the distances.

Assuming that the local probes 12 and 14 are cantilever probes adapted to atomic force microscopy, FIG. 1 shows a situation in which probe 12 contacts the sample surface with relatively high reaction force (for example, 100 pN), giving rise to a corresponding deflection of the cantilever and a detection signal sufficiently strong to enable feedback control, whereas the other local probe is located well above the sample surface and interacts with the sample only weakly, so that only a weak deflection or weak deflections of the cantilever of probe 14 corresponding to interaction forces of a few pN may take place, which give rise to only weak detection signals possibly not sufficiently strong for enabling a feedback control of the distance. The interaction forces may be in the range of thermally induced fluctuation forces on the cantilever.

According to the approach of the invention, measurements of such weak interactions on a local probe are enabled under stabilized measurement conditions even for a long time, since the feedback control is based on the detection signals obtained for the other local probe which strongly interacts with the sample. Any piezo drift or mechanical or thermal instability of the mechanical connection loop between the probes 12 and 14, on the one hand, and the sample 22 on the other hand may be compensated by the feedback control stabilization of both local probes with respect to the sample obtained on the basis of the detection signal obtained for one local probe. Accordingly, the other local probe (probe 14) has stabilized measurement conditions (i.e., a stabilized distance with respect to the sample) to allow long-time measurements at high stability. Accordingly, even thermal fluctuations of the position (possibly deflection) of the local probe 14 may be analysed.

Referring again to the connection part 16 rigidly connecting the two local probes 12 and 14, the following should be mentioned. For high requirements with respect to the stabilisation, the connection part should be characterized by a coupling path between the two local probes, which has a path length in the order of magnitude of dimensions of the local probes themselves. Further, the rigidity of the mechanical ocupling effected by the connection part should be such that it has associated a resonance frequency well above a limiting frequency associated with the detectors 40 and 42, so that any vibrations of the two local probes with respect to each other induced by vibrations of the connection part will not be detected. Further, if a resonance frequency can be associated with the local probes themselves, it is preferred that the resonance frequency associated with the connection part lies well above the resonance frequencies of the local probes.

Evidently, there still may occur several interactions between the local probe used for distance stabilization (probe 12 in FIG. 1) and sample 22. Often, however, there may be an interaction regime in which one of those Interactions dominates the other interactions so that, in practice, there will be no significant distortion of the contrast mechanism relevant to the resolution of local probe microscopy. In any case, one might locate the sample in such a way with respect to the local probes so that only the local probe used for obtaining the measurement information interacts with the sample and the other local probe, which is used for the feedback control of the distances, interacts with a reference surface. In this case, there will be a well-defined interaction between the local probe used for the feedback control (in the following also referred to as "distance sensor") and the reference surface. Accordingly, the measurement condition for the other local probe (in the following also referred to as "interaction sensor") may be defined with reference to the detection results obtained for the distance sensor, allowing stabilized measurements at well-defined distances from the sample, for example, to obtain force-distance profiles without any distortions of the "distance axis" because of multiple interactions between the distance sensor and the sample.

The distance between the two local probes 12 and 14 in a height direction associated with the sample (in FIG. 1, the Z-direction) may be adjustable. In case of cantilever probes used in atomic force microscopy, a distance (height) of about 10 to 20 $\mu$m may be appropriate. However, also other height differences (for example, about 1 to 100 $\mu$m) may be appropriate depending on the sample and the measurement situation. The height difference may be adjustable, for example, by tilting a short face of a substrate integral with the cantilever probes against the sample surface.

Referring again to FIG. 1, the local probe measuring device 10 comprises a controller 48 adapted to control the piezo transducer via the feedback transformer 46. For example, the controller 48 sets a setpoint value (a desired value) representing a setpoint distance of local probe 12 with respect to the sample. The feedback control loop regulates the Z-position of the sample stage via the piezo transducer 28 so that a deviation between an actual value and the setpoint value approaches zero. The control characteristics of the feedback control loop may be selected as desired and may comprise at least one of an integral, differential, and proportional control characteristic.

The feedback transformer 46 may, at least in part, be realized by the controller 48 itself. This applies in particular when the controller is implemented on the basis of a digital processor. However, the feedback transformer 46 and the feedback control loop 44 may as well be implemented on the basis of analog electronic components. With respect to the setting of the setpoint value, the controller may even be implemented by means of a simple potentiometer or the like. Of course, a digital implementation of the controller and of the feedback control loop according to the state of the art is preferred.

The control scheme described so far may be supplemented by a second feedback control loop on the basis of measurement data referring to local measurements effected by the local probe serving as "interaction sensor", i.e. the "other local probe". This second feedback control loop should be characterized by a time constant shorter than a time constant characterizing the first control loop on the basis of measurement data referring to local measurements effected by the local probe serving as "distance sensor". One can think of the two feedback control loops as feedback control sub-loops of an overall feedback control loop. According to this supplemented control scheme, the feedback control on the basis of measurement data referring to the "distance sensor" may provide for a compensation of thermal drift or other drifts characterized by a rather long time constant, whereas the additional feedback control loop on the basis of measurement data referring to the "interaction sensor" may allow a detection of fine structures of the sample, i.e. topological details of the sample surface.

The controller 48 receives measurement data referring to the local measurements effected by the two local probes 12 and 14 from the detectors 40 and 42. The received measurement data can be evaluated with respect to the control of the piezo transducer, for example, to determine the appropriate setpoint value. Further, the received measurement data can be processed by the controller to obtain the desired measurement information. This information, as explained, is primarily contained in the measurement data referring to local probe 14 serving as an interaction sensor. However, also the measurement data referring to local probe 12 serving as a distance sensor may be evaluated to obtain the desired measurement information. This measurement information or/and the raw data obtained from the detectors 40 and 42 may be stored in any storage device and may be displayed on a monitor or printed via a graphics printers or the like.

So far, only a control of the distances of the local probes 12 and 14 with respect to the sample 22 has been considered. With this control, a relative movement of the local probes 12 and 14 with respect to the sample 22 in the Z-direction can be effected, for example, to obtain force-distance profiles. Further, the controller 48 is adapted to control the piezo transducer 28 to effect a lateral scanning or sampling of the sample 22 in the X- and Y-directions. With this lateral scanning, a topographic imaging of the sample by the probes 12 and 14 may be effected. In case that the sample that has a planar surface or any changes of the sample height occur over lateral distances larger than the lateral distance between the two local probes 12 and 14, the provision of an additional distance sensor allows easy scanning of the sample by the interaction sensor in a "distance mode" or "lift mode" in which the respective distance between the interaction sensor and the sample surface can be maintained at high stability. This "distance" mode may even be used in case of a sample having height variations with lateral dimensions in the order of the lateral distance between the two probes. In such a case, one can, in a first step, measure the topography of the sample by means of the distance sensor. After this first pass across the sample surface, the distance of the interaction sensor 14 can be controlled at high stability an the basis of the measurement data obtained during the first pass, so that in a second pass across the sample surface, the interaction between the sample surface and the interaction sensor can be measured for a defined distance between the interaction sensor and the sample surface. Generally, the stabilization of distance relations or generally of measurement conditions, on the basis of measurement data obtained for an additional local probe can be used advantageously for any measurement scheme of the respective local probe microscopy technique.

A central requirement for the measurement scheme according to the invention described above, is independent detection of measurement data for the distance sensor and the interaction sensor. If there is a plurality of distance sensors, for example, three or more sensors arranged around one interaction sensor, independent detection for all sensors is desired. However, there might be cases where independent detection for the distance sensors or a plurality of distance sensors, on the one hand, and the interaction sensor or a plurality of interaction sensors, on the other, is sufficient for certain measurement situations.

An independent detection of measurement data for a plurality of local probes can be obtained for all detection principles used in the context of local probe microscopy. In the case of deflecting cantilever probes, for example, one might use piezo-electrical cantilevers, each of which produces its own electrical deflection signals used for the feedback control or measurements of interactions with the sample, respectively.

Figure 2:
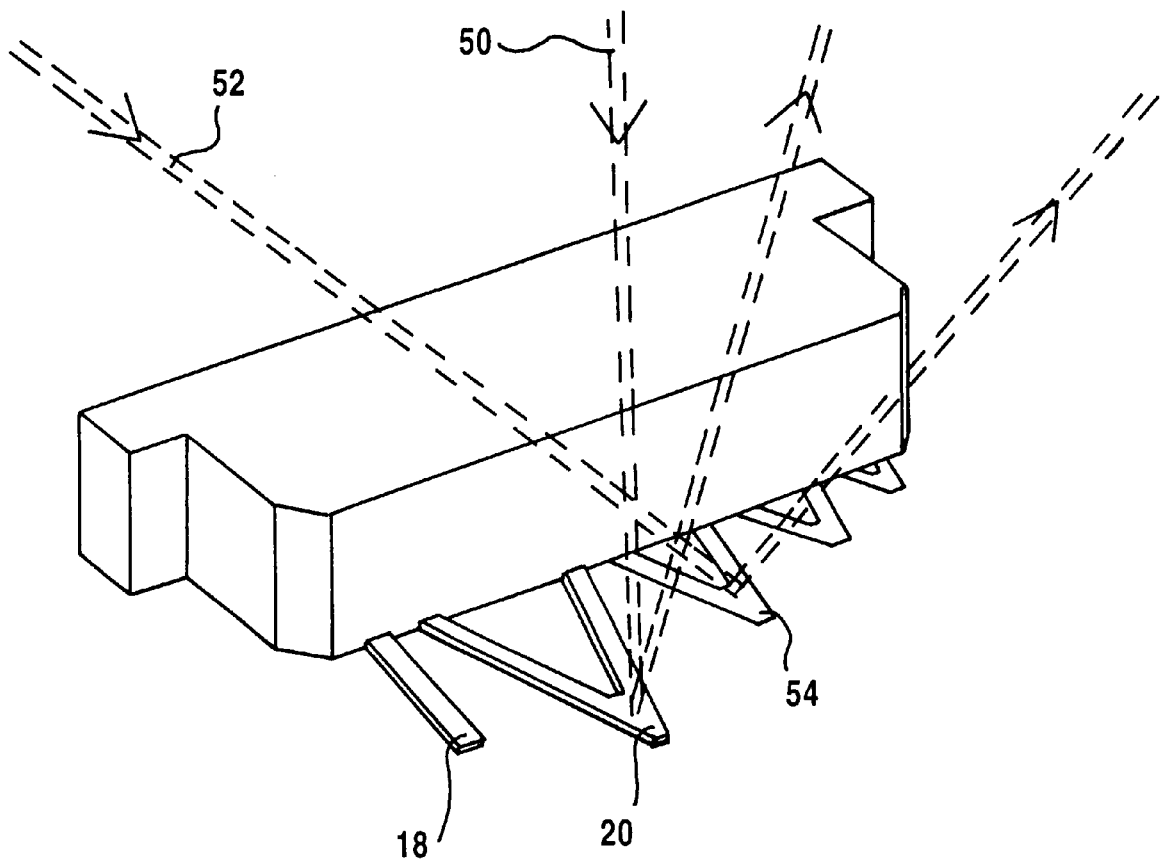
FIG. 2 shows a plurality of cantilever probes to be used as local probes which are integral parts of a cantilever substrate, two of those cantilever probes being illuminated by laser radiation to detect displacements of the respective cantilever probe.

Further, independent optical detection of cantilever deflections is possible. FIG. 2 shows a cantilever substrate having a plurality of cantilevers. There are two laser beams 50 and 52, one being directed against the back of the triangular cantilever 20 and the other being directed against the back of the neighboring triangular cantilever 54. For example, cantilever 20 may serve as a distance sensor and cantilever 54 as an interaction sensor.

The laser beams are reflected by the cantilever backs onto a respective position-sensitive sensor, for example, a segmented photo-diode, giving rise to deflection signals representing the deflection of the respective cantilever. Since both cantilevers have associated there own laser beam and their own position-sensitive detector, the deflections of both cantilevers may be detected independently of each other.

Besides the possible configurations mentioned so far, many other configurations are possible. For example, it is not necessary that the distance sensor and the interaction sensor are of the same local probe microscopy type. For many measurement situations, it will be appropriate to use local probe microscopy probes of the same probe type for the distance sensor and the interaction sensor, for example, two atomic force microscopy probes or two scanning tunneling microscopy probes and the like. In other situations, it might be appropriate to use different local probe microscopy probes for the distance sensor and the interaction sensor, for example, a local probe of the scanning tunneling microscopy type for the distance sensor and a local probe of the atomic force microscopy or scanning force microscopy type for the interaction sensor. Correspondingly, the same applies to cases where a plurality of interaction sensors or/and a plurality of distance sensors are used.

Further, the detection principle according to which data representing the local measurement effected by the respective local probe are detected may be different or may be the same. Generally, any detection principle which appears appropriate with respect to the type of the respective local probe can be chosen to obtain measurement data representing the local measurements effected by the respective local probe. In case of the cantilever probes shown in FIG. 2, two cantilevers are simultaneously probed by laser beams to measure the deflection of the respective cantilever. Other detection principles to measure cantilever deflections are known and need not be enumerated here. In case of local probes of the scanning tunneling microscopy type, one would measure a tunneling current resulting from a quantum mechanical interaction between a probe tip and the sample.

Figure 3:
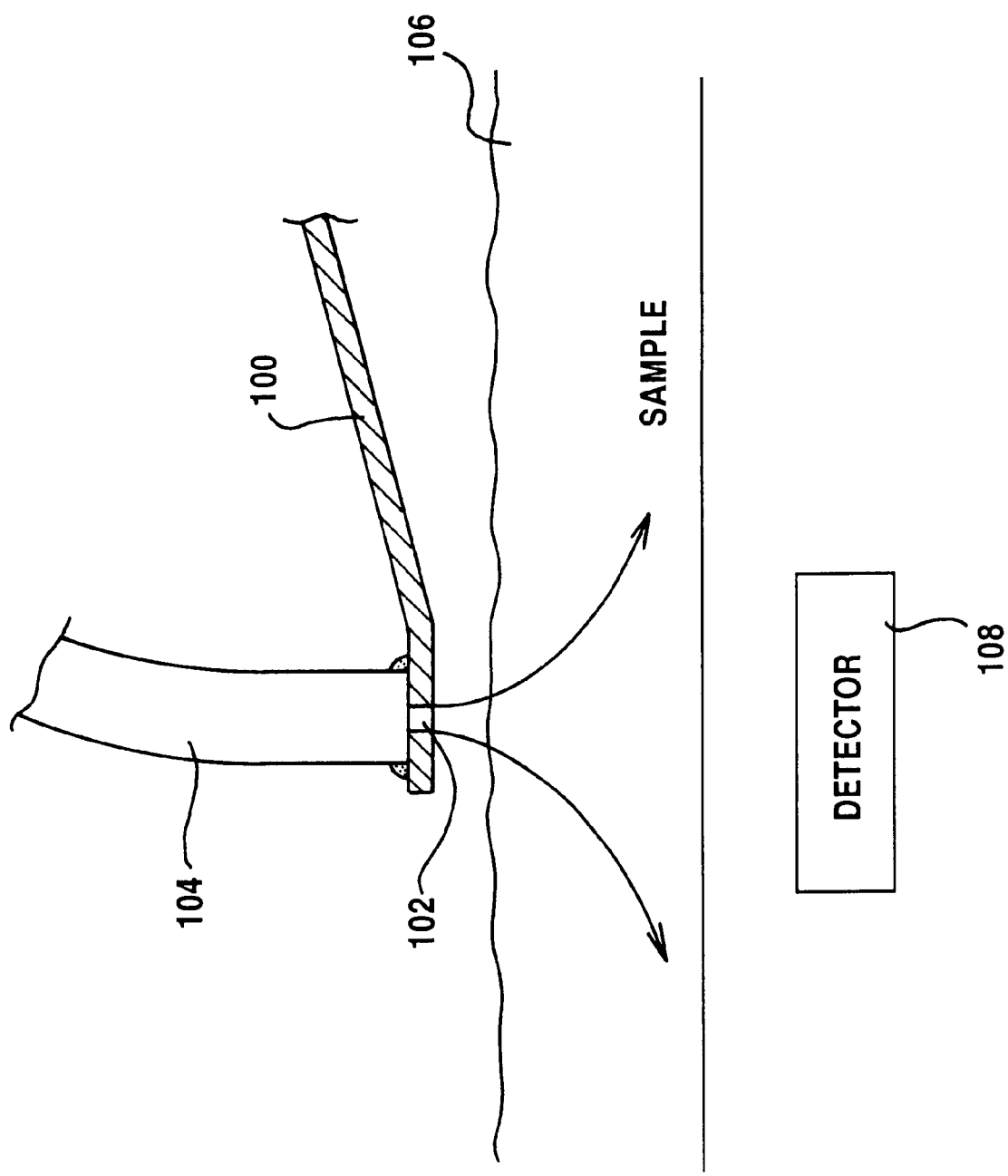
FIG. 3 shows schematically a near-field optical microscopy probe of the cantilever type, which can be used for effecting scanning near-field optical microscopy (SNOM) measurements.

In case of local probes of the scanning near-field optical microscopy type, an optical far-field resulting from a near-field illumination of a sample through a sub-wavelength sized aperture has to be detected to obtain a resolution beyond the Abbe diffraction limit. Such a measurement situation is shown in FIG. 3. A cantilever 100 serving as a local probe has an aperture 102, which is illuminated via an optical fiber 104 by optical radiation having a longer wavelength than the size of the aperture. An optical near-field on the other side of the end portion of the cantilever interacts with the sample 106 and gives rise to a far field which can be detected by a detector 108. The height of the aperture end portion of the cantilever 100 over the sample 106 can, according to the principles of the invention explained above, be controlled on the basis of interactions of another local probe, preferably another cantilever probe serving as a distance sensor. The cantilever 100, or even only the aperture 102, may be regarded as an interaction sensor in the sense of the principles of the invention explained above, irrespective of the fact that in case of a measurement situation as shown in FIG. 3. there no detection of data referring to the interaction sensor per se, but a detection of data referring to an interaction between the interaction sensor (the aperture 102), an optical field (generally an interaction field), and a sample, with no direct interaction between the detector and the interaction sensor.

Other interaction fields influencing or bringing about an interaction between a local probe and a sample comprise electrostatic fields, magnetic fields, and electromagnetic fields. Further, an interaction between a local probe and a sample may be influenced or even brought about by interaction media (for example, fluids, gases, gas mixture or liquids) which interact with the sample or/and with the respective local probe. To hold such an interaction medium, the device shown in FIG. 1 has a medium receptacle symbolized by broken line 110. Dependent on the sample, the interaction medium may be simply water or air.

The range of possible measurements which can be effected by using a local probe measuring device having a plurality of local probes can be extended significantly if probes are used which are functionalized with respect to the sample. For example, it is possible to bind sensing molecules to an AFM tip or to colloidal fields attached to an AFM cantilever. The molecules bound to the AFM probe can then be used as chemical sensors to detect forces between molecules on the tip and target molecules on a surface. This allows extremely high-sensitivity chemical sensing. As with chemically modified probes, one may tailor AFM probes to sense specific biological reactions. One could, for example, the binding forces of individual ligand-receptor pairs. To this end, an AFM probe tip may be coated with receptor molecules. Another example is the measurement of interaction forces between complementary DNA strains. To this end, one could bind DNA to a sample surface, on the one hand, and to a spherical probe attached to an AFM cantilever, on the other. There are many other examples of possible applications. Reference is had to the numerous literature about scanning probe microscopy and the different probing technologies developed so far. For all measurement situations in which the measurement results depend on the distance of the respective local probe of a sample, the principles of the present invention which allow independent measurement of the distance can be used advantageously. More generally: in any local probing technique in which well-defined local measurement conditions are desirable, the principles of the present invention which allow stabilization of these local measurement conditions on the basis of measurement data referring to local measurements effected by at least one other local probe can be used advantageously. If these local measurement conditions refer not only to the distance or to other parameters, the additional local probe can be denoted as measurement condition sensor instead of distance sensor.

In the following, some specific examples of preferred applications of a local probe measuring device of the atomic force microscopy type according to the invention will be given with reference to FIGS. 4 to 6. It is assumed that cantilever probes are used as local probes.

Figure 4A:
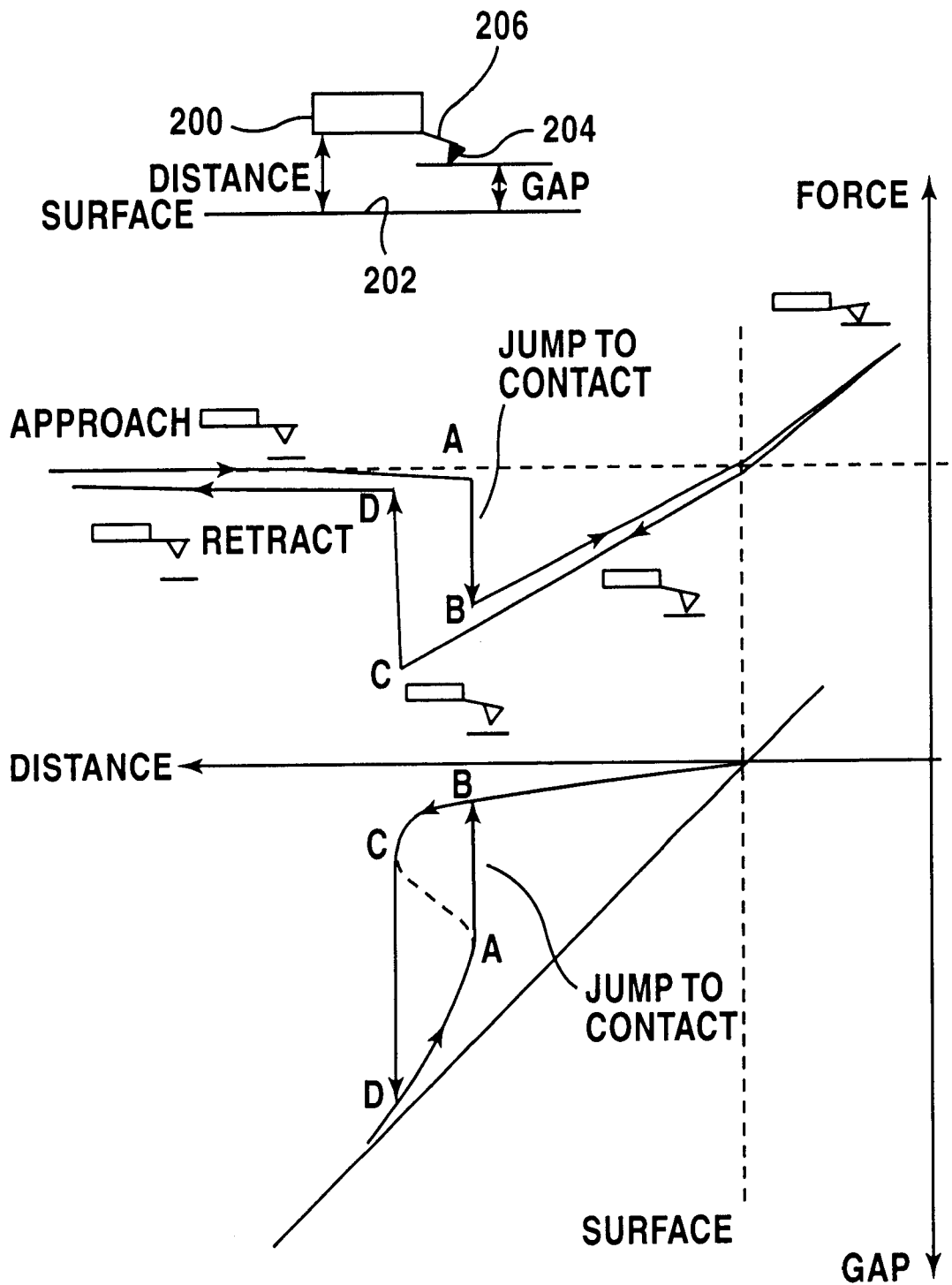
FIG. 4 shows three schematic diagrams illustrating examples of measurements which can be effected with a local probe measuring device according to the invention of the scanning force microscopy (SFM) or atomic force microscopy (AFM) type.

FIGS. 4a) and b) show schematically examples of force spectroscopy measurements. FIG. 4a), in the upper of the diagram, shows a force-distance profile which can be obtained if a cantilever substrate 200 is moved towards a sample surface 202 at a defined velocity until the probe tip 204 contacts the surface 202 and is retracted thereafter. During this positioning cycle, the force detected by the cantilever is recorded as a function of the distance between the substrate 202 and the surface. This distance can, according to the invention, be calibrated or measured by means of an additional cantilever serving as a distance sensor, since the height distance between the sensors can be measured with high accuracy, for example in advance of the spectroscopic measurements. Accordingly, the cantilever 206 having the tip 204 shown in FIG. 4 can be denoted as an interaction cantilever.

The shape of the force-distance profile shown in the diagram can be explained as follows. Near the sample surface there is a potential resulting from the interaction between the sample and the cantilever tip. The force sensed by the cantilever is given by the gradiant of this potential as a function of the distance between the sample surface and the tip. Near the sample, the tip jumps into contact with the sample if the potential has a gradient larger than the elastic force constant of the cantilever. As soon as there is a hard contact between the tip and the sample surface, the force on the cantilever is primarily governed by the spring constant of the cantilever.

During the retraction of the substrate with the cantilever, there are generally larger forces acting on the tip, which give rise to the hysterisis shown in the force-distance profile.

In the lower part of FIG. 4a), the gap between the tip and the surface is shown as a function of the distance between the substrate and the surface.

Figure 4B:
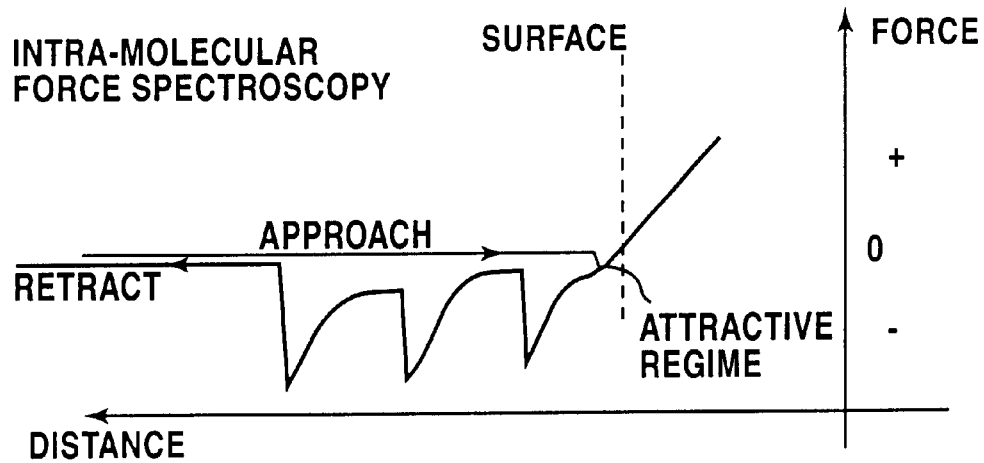

FIG. 4b) shows a schematic example of an intra-molecular force spectroscopy measurement result. During intra-molecular force spectroscopy measurements, molecules such as DNA strains, proteins, and so on, are stretched between a surface and an atomic force tip. The tension forces acting on the cantilever are recorded as a function of the distance. According to the invention, the distance can be measured or calibrated at high precision on the basis of deflection measurements relating to an additional cantilever, the distance cantilever. Another example, are inter-molecular force spectroscopy measurements which can be used, for example, for the measurement of adhesion forces between cells, binding forces between specific molecules, for example, ligand-receptor combinations.

Figure 4C:
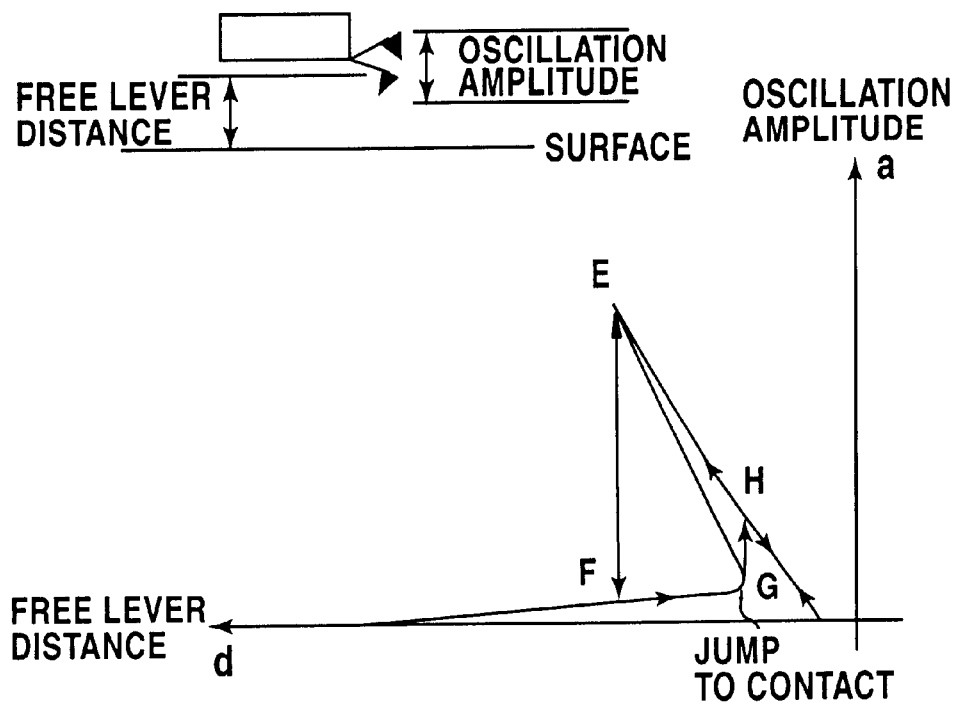

FIG. 4c) schematically shows the behavior of an oscillating cantilever as a function of a lever distance with respect to a surface. The cantilever is externally driven to oscillate at a certain frequency. The interactions between the oscillating cantilever and the sample, in particular, the sample surface, lead to a dependency of the oscillating amplitude of the distance. This dependency can be evaluated to obtain information about the interactions. According to the invention, the distance can be measured or calibrated on the basis of an additional cantilever, the distance sensor.

Instead of an oscillation of the cantilever by external driving, one can also use the thermal noise, i.e., thermal position fluctuations of the cantilever, to obtain information about the interaction between the cantilever and the sample surface.

Figure 5A:
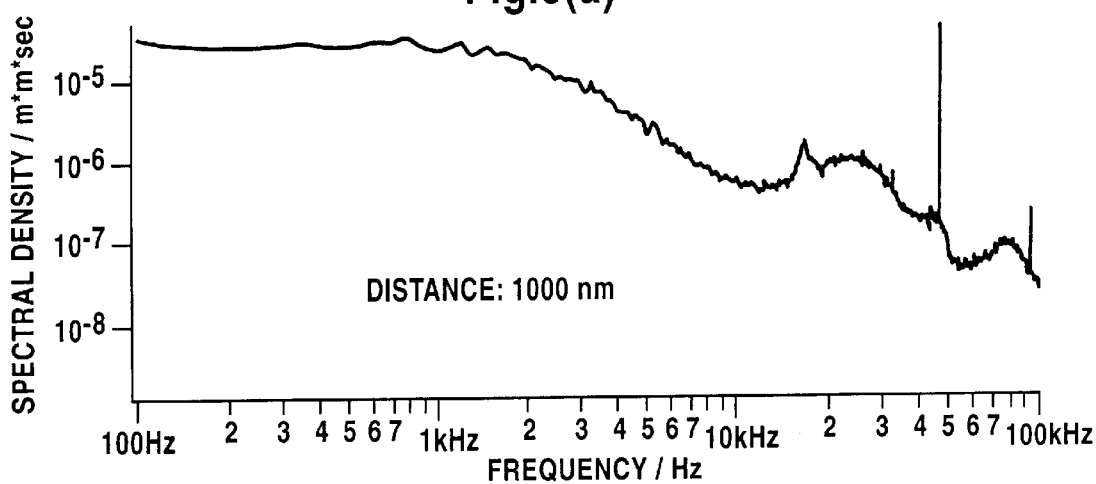
FIG. 5 shows measurement results obtained with a cantilever probe measuring device according to the invention which refer to thermal position fluctuations of a cantilever probe for two minute distances of the respective cantilever probe with respect to a surface.
Figure 5B:
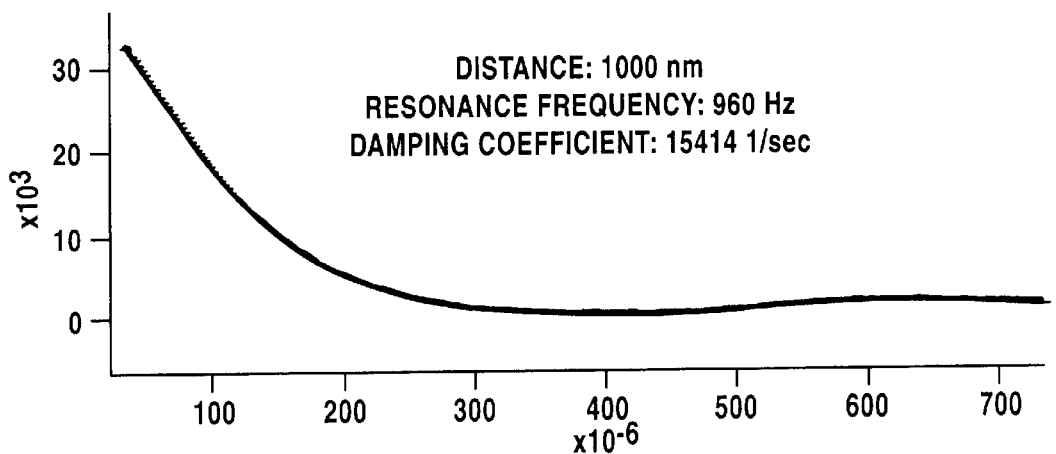
Figure 5C:
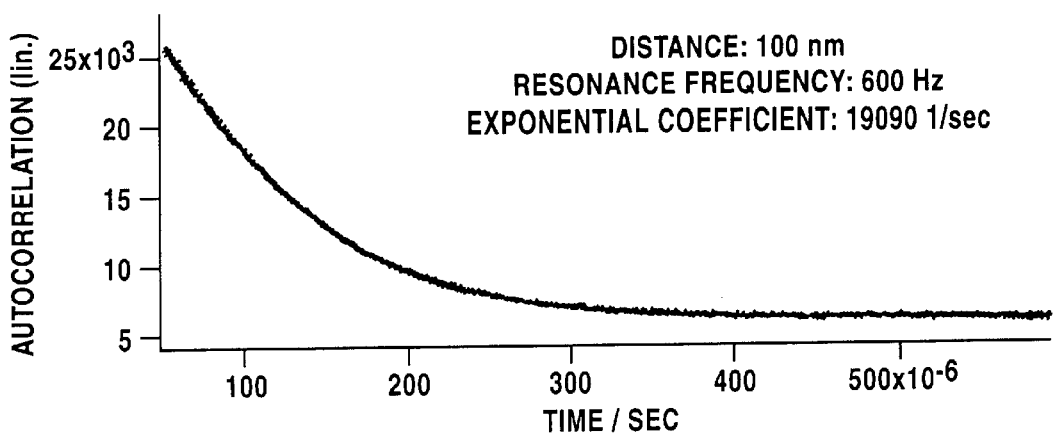

FIG. 5, in diagram a), shows a frequency spectrum representing thermally induced vibrations of a cantilever at a distance 1000 nm of a surface. Diagram b) shows a corresponding positional autocorrelation function. Diagram c) shows a corresponding positional autocorrelation function for a distance of only 100 nm. From the measurement data, a number of parameters characterizing the thermally induced vibrations of the cantilever may be calculated, for example, a resonance frequency and a damping coefficient.

Since thermal noise measurements require relatively long measurement periods, it is very important to compensate any thermal drift to maintain stable measurement conditions, in particular, with respect to the distance. According to the invention, this can be effected by means of a second cantilever, the distance sensor. Further, since there are changes of the thermally induced cantilever oscillations on a minute distance scale, it is very important to measure at well-defined distances. According to the invention, this can be effected via the additional cantilever, the distance sensor.

Figure 6D:
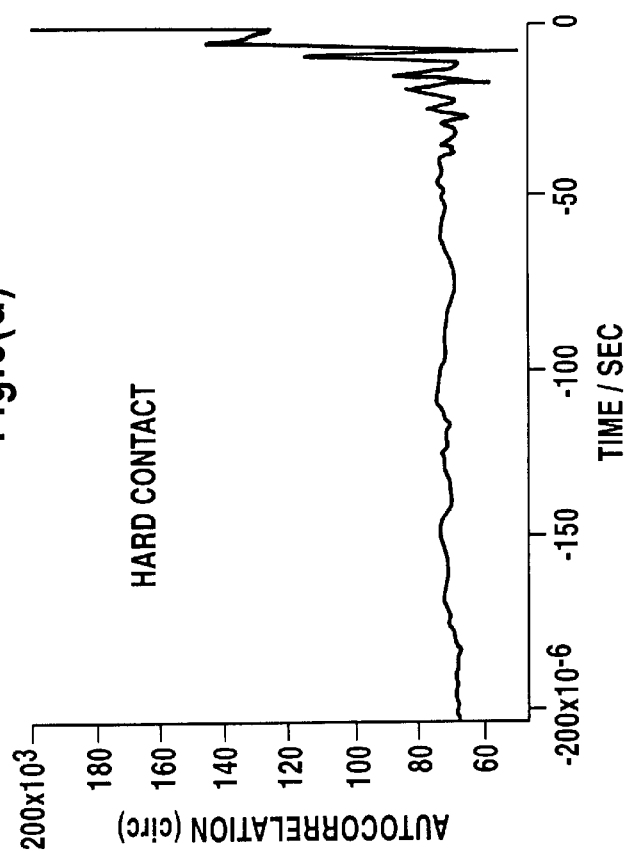
FIG. 6 shows further measurement results obtained with the cantilever probe measuring device referring to thermal position fluctuations of the respective cantilever probe for so-called "soft contact" and so-called "hard contact" of the cantilever probe with the surface.
Figure 6C:
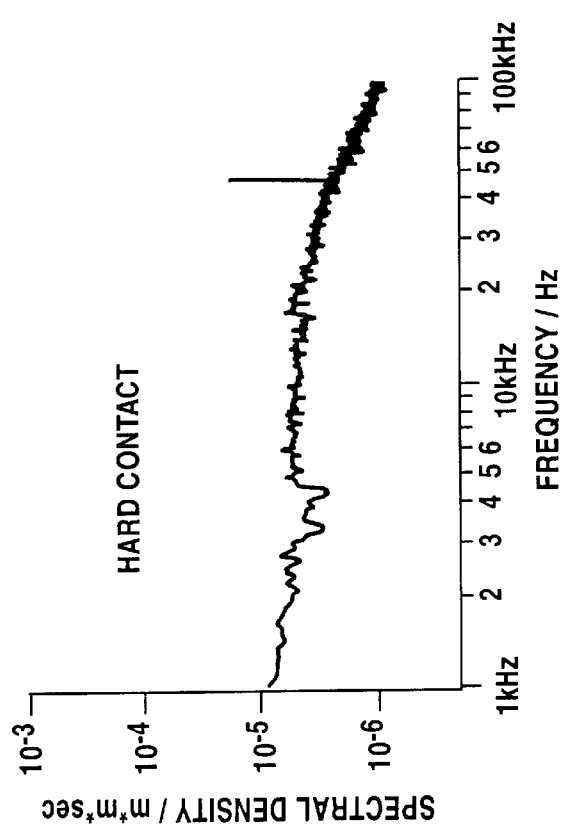

The high sensitivity of noise measurements for interactions between the cantilever and the surface and, possibly, a surrounding medium can be seen, in particular, in FIG. 6. Diagrams a) and b) show a noise spectrum and a corresponding positional autocorrelation function for a so-called "soft contact" of the cantilever tip on the surface, i.e., in this case, forces between the surface and the cantilever lower than 20 pN. whereas diagrams c) and d) show the spectrum and the corresponding positional autocorrelation function for a so-called "hard contact" between the cantilever tip and the surface, i.e., forces above 500 pN between the cantilever and the surface. If a cantilever probe measuring device according to the invention is used, stable measurement conditions (for example, defined "soft contact" conditions) can be maintained even over a long measurement period, since at least one additional cantilever, the distance sensor, allows a defined adjustment of the distance via feedback control.

The invention provides a local probe measuring device for effecting local measurements refering to a sample, comprising a first local probe for local measurements with respect to a sample or a reference surface, a second local probe for local measurements with respect to the sample or the reference surface, a measurement condition adjustment arrangement adapted to commonly adjust a first measurement condition of the first local probe with respect to the sample or the reference surface and a second measurement condition of the second local probe with respect to the sample or the reference surface, a detection arrangement comprising a first detection arrangement associated with the first local probe adapted to independently detect first measurement data refering to local measurements effected by said first local probe and a second detection arrangement associated with the second local probe adapted to independently detect second measurement data refering to local measurements effected by said second local probe. Further, methods for effecting local measurements and local manipulations by means of multiple local probes are provided.

What is claimed is:

1. A local probe measuring device for effecting local measurements referring to a sample, comprising:
   a first local probe for local measurements with respect to a sample or a reference surface;
   a second local probe for local measurements with respect to the sample or the reference surface;
   a rigid mechanical coupling between the first local probe and the second local probe;
   a positioning arrangement adapted to commonly adjust distance relations of the probes with respect to the sample or the reference surface to commonly adjust
      a first measurement condition of the first local probe with respect to the sample or the reference surface, and
      a second measurement condition of the second local probe with respect to the sample or the reference surface;
   a detection arrangement comprising
      a first detection arrangement associated with the first local probe and adapted to independently detect first measurement data referring to local measurements effected by said first local probe, and
      a second detection arrangement associated with the second local probe and adapted to independently detect second measurement data referring to local measurements effected by said second local probe; and
   a controller adapted to control via said positioning arrangement said distance relations on the basis of at least one of said first and second measurement data,
   wherein at least one of said first and second measurement conditions is roughly adjusted on the basis of one of said first and second measurement data and is finely adjusted on the basis of the other of said first and second measurement data.

2. A local probe measuring device for effecting local measurements referring to a sample, comprising:
- a first local probe for local measurements with respect to a sample or a reference surface;
- a second local probe for local measurements with respect to the sample or the reference surface;
- a rigid mechanical coupling between the first local probe and the second local probe;
- a positioning arrangement adapted to commonly adjust distance relations of the probes with respect to the sample or the reference surface to commonly adjust
  - a first measurement condition of the first local probe with respect to the sample or the reference surface, and
  - a second measurement condition of the second local probe with respect to the sample or the reference surface;
- a detection arrangement comprising
  - a first detection arrangement associated with the first local probe and adapted to independently detect first measurement data referring to local measurements effected by said first local probe, and
  - a second detection arrangement associated with the second local probe and adapted to independently detect second measurement data referring to local measurements effected by said second local probe; and
- a controller adapted to control via said positioning arrangement said distance relations on the basis of at least one of said first and second measurement data, wherein at least one of said first and second measurement conditions is adjusted on the basis of one of said first and second measurement data according to a time constant and is adjusted on the basis of the other of said first and second measurement data according to another time constant.

3. A local probe measuring device for effecting local measurements referring to a sample, comprising:
- a first local probe for local measurements with respect to a sample or a reference surface;
- a second local probe for local measurements with respect to the sample or the reference surface;
- a rigid mechanical coupling between the first local probe and the second local probe;
- a positioning arrangement adapted to commonly adjust distance relations of the probes with respect to the sample or the reference surface to commonly adjust
  - a first measurement condition of the first local probe with respect to the sample or the reference surface, and
  - a second measurement condition of the second local probe with respect to the sample or the reference surface;
- a detection arrangement comprising
  - a first detection arrangement associated with the first local probe and adapted to independently detect first measurement data referring to local measurements effected by said first local probe, and
  - a second detection arrangement associated with the second local probe and adapted to independently detect second measurement data referring to local measurements effected by said second local probe, wherein said second detection arrangement is adapted to detect a second interaction of said second local probe with the sample or the reference surface independently of any interaction of the first local probe with the sample or the reference surface to obtain said second measurement data, wherein a controller, said positioning arrangement and said detection arrangement are adapted
- to adjust said first measurement condition on the basis of said first measurement data and then to obtain said second measurement data for the resulting second measurement condition, or
- to adjust said second measurement condition on the basis of said second measurement data and then to obtain said first measurement data for the resulting first measurement condition, and wherein said controller and said detection arrangement are adapted to obtain first measurement data as a function of second measurement data or vice versa.

4. A local probe measuring device for effecting local measurements referring to a sample, comprising:
- a first local probe for local measurements with respect to a sample or a reference surface;
- a second local probe for local measurements with respect to the sample or the reference surface,
- a rigid mechanical coupling between the first local probe and the second local probe;
- a positioning arrangement adapted to commonly adjust distance relations of the probes with respect to the sample or the reference surface to commonly adjust
  - a first measurement condition of the first local probe with respect to the sample or the reference surface, and
  - a second measurement condition of the second local probe with respect to the sample or the reference surface;
- a detection arrangement comprising
  - a first detection arrangement associated with the first local probe and adapted to independently detect first measurement data referring to local measurements effected by said first local probe, and
  - a second detection arrangement associated with the second local probe and adapted to independently detect second measurement data referring to local measurements effected by said second local probe; and
- a feedback control loop comprising said positioning arrangement and one of said first and second detection arrangements to stabilize at least one of said first and second measurement conditions, wherein said feedback control loop comprises two feedback control sub-loops, one comprising one of said first and second detection arrangements, and the other comprising the other of said first and second detection arrangements, said feedback control loops having different time constants.

5. A local probe measuring device for effecting local measurements referring to a sample, comprising:
- a first local probe for local measurements with respect to a sample or a reference surface;
- a second local probe for local measurements with respect to the sample or the reference surface;
- a rigid mechanical coupling between the first local probe and the second local probe;
- a positioning arrangement adapted to commonly adjust distance relations of the probes with respect to the sample or the reference surface to commonly adjust a first measurement condition of the first local probe with respect to the sample or the reference surface, and a second measurement condition of the second local probe with respect to the sample or the reference surface;

a detection arrangement comprising a first detection arrangement associated with the first local probe and adapted to independently detect first measurement data referring to local measurements effected by said first local probe, and a second detection arrangement associated with the second local probe and adapted to independently detect second measurement data referring to local measurements effected by said second local probe, wherein a distance between interaction or measurement sections of said local probes in a height direction associated with said sample or said reference surface is adjustable.

6. The device according to claim 5, wherein the distance is adjustable by tilting at least one of a mounting arrangement of said local probes and a probe substrate integral with said local probes.

7. A local probe measuring device for effecting local measurements referring to a sample, comprising:

a first local probe for local measurements with respect to a sample or a reference surface;

a second local probe for local measurements with respect to the sample or the reference surface;

a rigid mechanical coupling between the first local probe and the second local probe;

a positioning arrangement adapted to commonly adjust distance relations of the probes with respect to the sample or the reference surface to commonly adjust:

a) a first measurement condition of the first local probe with respect to the sample or the reference surface, and b) a second measurement condition of the second local probe with respect to the sample or the reference surface;

a detection arrangement comprising a first detection arrangement associated with the first local probe and adapted to independently detect first measurement data referring to local measurements effected by said first local probe and a second detection arrangement associated with the second local probe and adapted to independently detect second measurement data referring to local measurements effected by said second local probe, wherein said detection arrangement comprises a piezo-electrical detection arrangement, and wherein at least one of said local probes comprises piezo-electrical material sensitive to movements of the respective local probe.

8. A local probe measuring device for measuring local interactions between a local probe arrangement and a sample, comprising:

a first local probe adapted to interact locally with a sample or a reference surface;

a second local probe adapted to interact locally with a sample or the reference surface;

a rigid mechanical coupling between the first local probe and the second local probe;

a positioning arrangement adapted to commonly adjust
at least one of a first distance of the first local probe with respect to the sample or the reference surface and a first local interaction of the first local probe with the sample or the reference surface, and at least one of a second distance of the second local probe with respect to the sample or the reference surface and a second local interaction of the second local probe with the sample or the reference surface;

a detection arrangement comprising a first detection arrangement associated with the first local probe and adapted to detect at least one of the first distance and the first local interaction independently of the second distance and the second local interaction, and a second detection arrangement associated with the second local probe and adapted to detect at least one of the second distance and the second local interaction independently of the first distance and the first local interaction; and a controller adapted to control via said positioning arrangement said first distance or said first local interaction on the one hand and said second distance or said second local interaction on the other hand on the basis of at least one of said detected first and second distances or on the basis of at least one of said detected first and said detected second interactions, wherein the respective distance or the respective interaction is roughly adjusted on the basis of one of said first and second distance or interaction and is finely adjusted on the basis of the other of said first and second distance or interaction.

9. A local probe measuring device for measuring local interactions between a local probe arrangement and a sample, comprising:

a first local probe adapted to interact locally with a sample or a reference surface;

a second local probe adapted to interact locally with a sample or the reference surface;

a rigid mechanical coupling between the first local probe and the second local probe;

a positioning arrangement adapted to commonly adjust at least one of a first distance of the first local probe with respect to the sample or the reference surface and a first local interaction of the first local probe with the sample or the reference surface, and at least one of a second distance of the second local probe with respect to the sample or the reference surface and a second local interaction of the second local probe with the sample or the reference surface;

a detection arrangement comprising a first detection arrangement associated with the first local probe and adapted to detect at least one of the first distance and the first local interaction independently of the second distance and the second local interaction, and a second detection arrangement associated with the second local probe and adapted to detect at least one of the second distance and the second local interaction independently of the first distance and the first local interaction; and a controller adapted to control via said positioning arrangement said first distance or said first local interaction on the one hand and said second distance or said second local interaction on the other hand on the basis of at least one of said detected first and second distances or on the basis of at least one of said detected first and said detected second interactions, wherein the respective distance or interaction is adjusted on the basis of one of said first and second distance or interaction according to a time constant and is adjusted on the basis of the other of said first and second distance or interaction according to another time constant.

10. A local probe measuring device for measuring local interactions between a local probe arrangement and a sample, comprising:
a first local probe adapted to interact locally with a sample or a reference surface;
a second local probe adapted to interact locally with a sample or the reference surface;
a rigid mechanical coupling between the first local probe and the second local probe;
a positioning arrangement adapted to commonly adjust
at least one of a first distance of the first local probe with respect to the sample or the reference surface and a first local interaction of the first local probe with the sample or the reference surface, and
at least one of a second distance of the second local probe with respect to the sample or the reference surface and a second local interaction of the second local probe with the sample or the reference surface;
a detection arrangement comprising
a first detection arrangement associated with the first local probe and adapted to detect at least one of the first distance and the first local interaction independently of the second distance and the second local interaction, and
a second detection arrangement associated with the second local probe and adapted to detect at least one of the second distance and the second local interaction independently of the first distance and the first local interaction; and
a controller adapted to control via said positioning arrangement said first distance or said first local interaction on the one hand and said second distance or said second local interaction on the other hand on the basis of at least one of said detected first and second distances or on the basis of at least one of said detected first and said detected second interactions,
wherein the controller and the detection arrangement are adapted to adjust via the positioning arrangement at least one of the first and second distances or one of the first and second interactions on the basis the one detected distance or interaction and then to measure the other of the first and second distances or the other of the first and second interactions,
wherein the controller, the positioning arrangement and the detection arrangement are adapted
to adjust the first distance or the first interaction on the basis of the first distance or interaction and then to measure the second distance or interaction for the resulting adjustment of the second local probe, or
to adjust the second distance or the second interaction on the basis of the second distance or interaction and then to measure the first distance or interaction for the resulting adjustment of the first local probe, and
wherein said controller and said detection arrangement are adapted to measure the first distance or interaction as a function of the second distance or interaction or vice versa.

11. A local probe measuring device for measuring local interactions between a local probe arrangement and a sample, comprising:
a first local probe adapted to interact locally with a sample or a reference surface;
a second local probe adapted to interact locally with a sample or the reference surface;
a rigid mechanical coupling between the first local probe and the second local probe;
a positioning arrangement adapted to commonly adjust
at least one of a first distance of the first local probe with respect to the sample or the reference surface and a first local interaction of the first local probe with the sample or the reference surface, and
at least one of a second distance of the second local probe with respect to the sample or the reference surface and a second local interaction of the second local probe with the sample or the reference surface;
a detection arrangement comprising
a first detection arrangement associated with the first local probe and adapted to detect at least one of the first distance and the first local interaction independently of the second distance and the second local interaction, and
a second detection arrangement associated with the second local probe and adapted to detect at least one of the second distance and the second local interaction independently of the first distance and the first local interaction; and a controller adapted to control via said positioning arrangement said first distance or said first local interaction on the one hand and said second distance or said
second local interaction on the other hand on the basis of at least one of said detected first and second distances or on the basis of at least one of said detected first and said detected second interactions; and
a feedback control loop comprising said positioning arrangement and one of said first and second detection arrangements to stabilize a distance or interaction relation for at least one of said first and second local probes with respect to said sample or said reference surface,
wherein said feedback control loop comprises two feedback control sub-loops, one comprising one of said first and second detection arrangements, and the other comprising the other of said first and second detection arrangements, said feedback loops having different time constants.

12. A local probe measuring device for measuring local interactions between a local probe arrangement and a sample, comprising:
a first local probe adapted to interact locally with a sample or a reference surface;
a second local probe adapted to interact locally with a sample or the reference surface;
a rigid mechanical coupling between the first local probe and the second local probe;
a positioning arrangement adapted to commonly adjust
at least one of a first distance of the first local probe with respect to the sample or the reference surface and a first local interaction of the first local probe with the sample or the reference surface, and
at least one of a second distance of the second local probe with respect to the sample or the reference surface and a second local interaction of the second local probe with the sample or the reference surface;
a detection arrangement comprising
a first detection arrangement associated with the first local probe and adapted to detect at least one of the first distance and the first local interaction independently of the second distance and the second local interaction, and a second detection arrangement associated with the second local probe and adapted to detect at least one of the second distance and the second local interaction independently of the first distance and the first local interaction, wherein a distance between interaction or measurement sections of said local probes in a height direction associated with said sample or said reference surface is adjustable.

13. The device according to claim 12, wherein the distance is adjustable by tilting at least one of a mounting arrangement of said local probes and a probe substrate integral with said local probes.

14. A local probe measuring device for measuring local interactions between a local probe arrangement and a sample, comprising:

a first local probe adapted to interact locally with a sample or a reference surface;

a second local probe adapted to interact locally with a sample or the reference surface;

a rigid mechanical coupling between the first local probe and the second local probe;

a positioning arrangement adapted to commonly adjust
at least one of a first distance of the first local probe with respect to the sample or the reference surface and a first local interaction of the first local probe with the sample or the reference surface, and
at least one of a second distance of the second local probe with respect to the sample or the reference surface and a second local interaction of the second local probe with the sample or the reference surface;

a detection arrangement comprising
a first detection arrangement associated with the first local probe and adapted to detect at least one of the first distance and the first local interaction independently of the second distance and the second local interaction, and
a second detection arrangement associated with the second local probe and adapted to detect at least one of the second distance and the second local interaction independently of the first distance and the first local interaction, wherein said detection arrangement comprises a piezo-electrical detection arrangement, and wherein at least one of said local probes comprises piezo-electrical material sensitive to movements of the respective local probe.

15. A local probe measuring device for effecting local measurements referring to a sample, comprising:

a first local probe for local measurements with respect to a sample or a reference surface;

a second local probe for local measurements with respect to the sample or the reference surface;

a measurement condition adjustment arrangement adapted to commonly adjust
a first measurement condition of the first local probe with respect to the sample or the reference surface, and
a second measurement condition of the second local probe with respect to the sample or the reference surface;

a detection arrangement comprising
a first detection arrangement associated with the first local probe and adapted to independently detect first measurement data referring to local measurements effected by said first local probe, and
a second detection arrangement associated with the second local probe and adapted to independently detect second measurement data referring to local measurements effected by said second local probe; and a controller adapted to control via said measurement condition adjustment arrangement said first and second measurement conditions on the basis of at least one of said first and second measurement data, wherein at least one of said first and second measurement conditions is roughly adjusted on the basis of one of said first and second measurement data and is finely adjusted on the basis of the other of said first and second measurement data.

16. A local probe measuring device for effecting local measurements referring to a sample, comprising:

a first local probe for local measurements with respect to a sample or a reference surface;

a second local probe for local measurements with respect to the sample or the reference surface;

a measurement condition adjustment arrangement adapted to commonly adjust
a first measurement condition of the first local probe with respect to the sample or the reference surface, and
a second measurement condition of the second local probe with respect to the sample or the reference surface;

a detection arrangement comprising
a first detection arrangement associated with the first local probe and adapted to independently detect first measurement data referring to local measurements effected by said first local probe and
a second detection arrangement associated with the second local probe and adapted to independently detect second measurement data referring to local measurements effected by said second local probe; and a controller adapted to control via said measurement condition adjustment arrangement said first and second measurement conditions on the basis of at least one of said first and second measurement data, wherein at least one of said first and second measurement conditions is adjusted on the basis of one of said first and second measurement data according to a time constant and is adjusted on the basis of the other of said first and second measurement data according to another time constant.

* * * * *